(12) United States Patent
Xiang et al.

(10) Patent No.: US 9,415,431 B2
(45) Date of Patent: Aug. 16, 2016

(54) HOT ROLLED SLAB IMPACT TYPE MECHANICAL SCALE REMOVAL DEVICE

(71) Applicant: BAOSHAN IRON & STEEL CO., LTD., Shanghai (CN)

(72) Inventors: Shunhua Xiang, Shanghai (CN); Hongquan Wen, Shanghai (CN)

(73) Assignee: BAOSHAN IRON & STEEL CO., LTD., Shanghai (CN)

(*) Notice: Subject to any disclaimer, the term of this patent is extended or adjusted under 35 U.S.C. 154(b) by 45 days.

(21) Appl. No.: 14/238,758

(22) PCT Filed: Sep. 24, 2012

(86) PCT No.: PCT/CN2012/081809
§ 371 (c)(1),
(2) Date: Feb. 13, 2014

(87) PCT Pub. No.: WO2013/143263
PCT Pub. Date: Oct. 3, 2013

(65) Prior Publication Data
US 2015/0013127 A1    Jan. 15, 2015

(30) Foreign Application Priority Data
Mar. 28, 2012  (CN) ...................... 2012 2 0121546 U

(51) Int. Cl.
*B21B 45/08* (2006.01)
*B21B 45/04* (2006.01)
(Continued)

(52) U.S. Cl.
CPC ................. *B21B 45/08* (2013.01); *B21B 45/04* (2013.01); *B21B 45/0218* (2013.01); *B21B 45/06* (2013.01); *Y10T 29/4544* (2015.01)

(58) Field of Classification Search
CPC ........ B21B 45/08; B21B 45/04; B21B 45/06; B21B 45/0218; Y10T 29/4544
See application file for complete search history.

(56) References Cited

U.S. PATENT DOCUMENTS

| 7,077,724 B1 | 7/2006 | Voges |
| 2008/0216925 A1 | 9/2008 | Mueth |

FOREIGN PATENT DOCUMENTS

| CN | 2531894 Y | 1/2003 |
| CN | 1184026 C | 1/2005 |

(Continued)

OTHER PUBLICATIONS

Korean Intellectual Property Office, Office Action, Application No. 10-2014-7004093, Oct. 16, 2014, 8 pages.

(Continued)

*Primary Examiner* — Moshe Wilensky
(74) *Attorney, Agent, or Firm* — Quarles & Brady, LLP

(57) ABSTRACT

A hot rolled slab impact type mechanical scale removal device comprises a front cooling water nozzle group, an impact type scale removal gear roller group, a roller cooling device and a cleaning water nozzle group. A slab moves on a slab roller table. The front cooling water nozzle group, the impact type scale removal gear roller group and the cleaning water nozzle group are arranged in sequence along the movement direction of the slab. The impact type scale removal gear roller group is arranged on a support seat. The cooling water nozzle of the roller cooling device is arranged corresponding to the impact type scale removal gear roller group. According to the scale removal device, the oxide skins can be clearly removed, the temperature of the continuous casting slabs can be reduced and the hot rolling quality is improved.

5 Claims, 2 Drawing Sheets

(51) Int. Cl.
  *B21B 45/06*  (2006.01)
  *B21B 45/02*  (2006.01)

(56) References Cited

FOREIGN PATENT DOCUMENTS

| CN | 18649880 A   | 11/2006 |
| CN | 201249351 Y  | 6/2009  |
| DE | 3208738 A1   | 9/1983  |
| JP | 58224020 A   | 12/1983 |
| JP | H04159068 A  | 6/1992  |
| JP | H06218424 A  | 8/1994  |
| JP | 2545158 B2   | 10/1996 |
| JP | 2007118028 A | 5/2007  |
| JP | 2011224629 A | 11/2011 |

OTHER PUBLICATIONS

Japan Patent Office, Office Action, Application No. 2014-506753, Sep. 2, 2014, 5 pages.

Korean Intellectual Property Office, Examination Result, Application No. 10-2014-7004093, May 26, 2015, 8 pages.

Japan Patent Office, Office Action, Application No. 2014-506753, Mar. 24, 2015, 4 pages [Includes an English Language Brief Explanation].

International Search Report under date of mailing of January 10, 2013 in connection with PCT/CN2012/081809.

HOT ROLLED SLAB IMPACT TYPE MECHANICAL SCALE REMOVAL DEVICE

FIELD OF THE DISCLOSURE

The present disclosure relates to the field of descaling device for hot rolled slab, in particular to a dry-type descaling device for hot rolled slab.

BACKGROUND OF THE DISCLOSURE

Casting blank has scales existing on surface after being heated by reheating furnace and before being transferred into a rolling mill, and the scales are need to be duly removed on-line. The main difficulties in surface descaling are as follows: 1. The surface temperature of the casting blanks is very high, that is, between 1100☐ and 1250☐, and the oxide layer thereof is so thick that it is hard to clean them clearly by existing methods; 2. Adhesivity between scales generated on surface of continuous-casting blanks such as stainless steel, silicon steel, iron-nickel alloy and the continuous-casting blank body is too strong to clean only by high-pressure water; 3. Hot rolling production line is sensitive to temperature of the blanks, and increasing amount of water may result in larger temperature drop of the continuous casting blank, which is harmful to the follow-up rolling.

The current common type of descaling is to clear the scales on the surface away by high-pressure water of more than 18 MPa, i.e. high-pressure water descaling. This type of descaling has the following disadvantages: 1. A large quantity of water is needed, and the temperature of the surface of the continuous-casting blanks drops sharply, which causes edge cracks on many high alloy products during the follow-up rolling; 2. High-pressure water descaling utilizes nozzles, and it is usual that the scales are not obliterated clearly, thereby resulting in that scales are pressed into the blank during follow-up rolling; 3. For high alloy steel (such as silicon steel, stainless steel, iron-nickel alloy), high-pressure water cannot clear non-ferric oxides (silicon oxide, chromic oxide, nickel oxide and the like), which substantially affects the surface quality of these products.

SUMMARY OF THE DISCLOSURE

The technical problem to be solved by the present disclosure is to provide an impact type mechanical descaling device for hot rolled slab, which utilizes rotational centrifugal tooth plate groups to knock the surface of a continuous-casting blank so as to separate scales therefrom, then utilizes low-medium pressure water to obliterate away the separated scales, which can clear away scales on the continuous-casting blanks of all kinds of steels, and make little impact on the temperature of the slab surface, thereby improving the hot rolling quality.

The objective of the present disclosure is achieved by an impact type descaling device for hot rolled slab, which includes a front cooling water nozzle group, impact descaling gear roller groups, a roller cooling device and a cleaning water nozzle group; a slab moves on a slab roller table; the front cooling water nozzle group, the impact descaling gear roller group and the cleaning water nozzle group are arranged in sequence in the moving direction of the slab; the impact type descaling gear roller group is mounted on a support seat, and the cooling water nozzles of the roller gear cooling device are provided corresponding to the impact type descaling gear roller groups.

The impact descaling gear roller group includes a main shaft, fixed plates, a descaling gear assembly shaft and a descaling gear group; there is one pair of fixed plates, which are fixed on the two sides of the main shaft; between the pair of fixation plates there are disposed with a plurality of descaling gear assembly shafts in a ring array with center at central-axis of the main shaft; the descaling gear group consists of a row of descaling gears which are mounted in sequence on the descaling gear assembly shaft.

There is a gap between each descaling gear and the descaling gear assembly shaft as the inner diameter of the former is 3~30 mm greater than the outer diameter of the latter.

The descaling device further includes a hot slab thickness measurement device which is disposed upstream of the front cooling water nozzle group, and a height adjustment device through which the impact type descaling gear roller group is mounted on the support seat.

There are two pairs of impact type descaling gear roller groups, between which a scale scraps cleaning water nozzle group is disposed.

The present disclosure, i.e. the impact type descaling device for hot rolled slab, utilizes rotational centrifugal tooth plate groups to knock the surface of a continuous-casting blank so as to separate scales from the continuous-casting blank, then utilizes low-medium pressure water to obliterate away the separated scales, which can clear away scales of the continuous-casting blank of all kinds of steels. It can also be utilized to descale on the surface of square blanks and is particularly suitable for stainless steel and iron-nickel alloy continuous-casting blanks, on the surface of which scales are difficult to clear away. Moreover, it can substantially reduce the temperature drop of the continuous-casting blanks, laying a foundation for the follow-up rolling. The present disclosure is small in volume, and can be mounted before the high-pressure water descaling box of the existing hot rolling production line, or on the new hot rolling line. Compared with the existing high-pressure water descaling, it can not only guarantee the cleanness of the descaled surface of the slab, but also save a large quantity of water—the water consumption is about 1/10 that of high-pressure water descaling. Furthermore, the present disclosure reduces energy consumption greatly and has little impact on the temperature of the slab surface, thereby improving the hot rolling quality.

BRIEF DESCRIPTION OF THE DRAWINGS

Thereinafter, the specific features and functions will be further given with reference to the embodiments and accompanying drawings.

Figure 1:
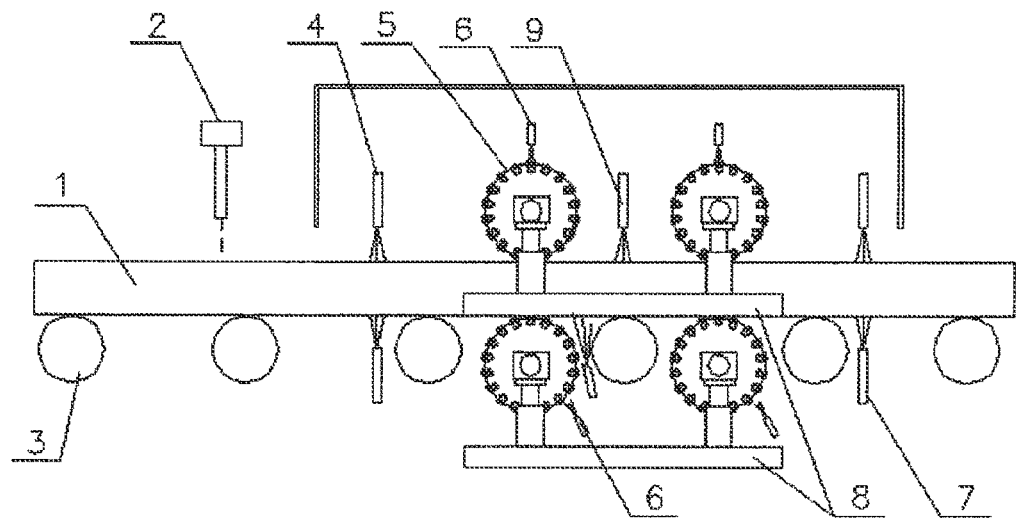
FIG. 1 is the schematic elevation view of the impact type mechanical descaling device for hot rolled slab according to the present disclosure.

In the drawings, slab 1, hot slab thickness measurement device 2, slab roller table 3, front cooling water nozzle group 4, impact type descaling gear roller group 5, roller gear cooling device 6, cleaning water nozzle group 7, support seat 8, scale scraps cleaning water nozzle group 9, scale 10, main shaft 51, fixed plate 52, descaling gear assembly shaft 53, descaling gear group 54.

DETAILED DESCRIPTION OF THE DISCLOSURE

The present disclosure will be further described in conjunction with detailed embodiments thereinafter. It should be understood that these embodiments are only used for illustrating the present disclosure but not for limiting the scope thereof. Furthermore, it should be understood that after reading the description of the present disclosure, the skilled in the art can make any variation or modification, whose equivalents falls equally into the scope defined by the appended claims of the application.

Embodiment 1

Figure 2:
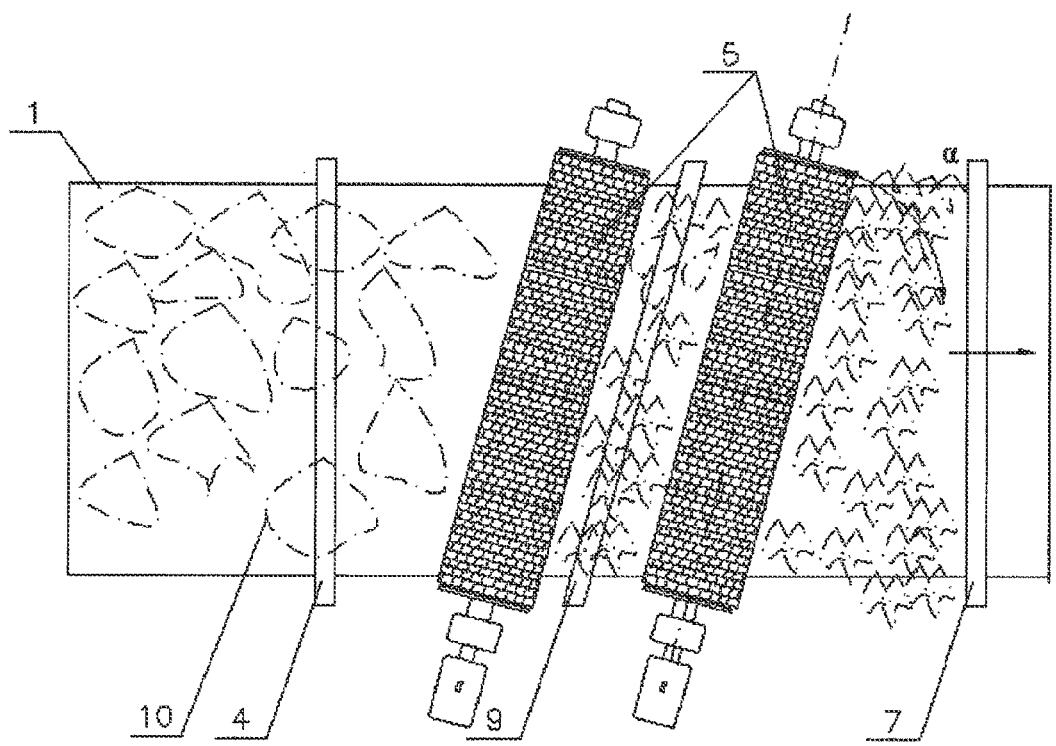
FIG. 2 is the schematic top plan view of the impact type mechanical descaling device for hot rolled slab according to the present disclosure.

As shown in FIG. 1 and FIG. 2, an impact type mechanical descaling device for hot rolled slab includes a front cooling water nozzle group 4, impact type descaling gear roller groups 5, a roller cooling device 6 and a cleaning water nozzle group 7. A slab 1 moves on a slab roller table 3. The front cooling water nozzle group 4, the impact type descaling gear roller group 5 and the cleaning water nozzle group 7 are arranged in sequence in the moving direction of the slab 1. The impact descaling gear roller group 5 is mounted on a support seat 8, and the cooling water nozzles of the roller gear cooling device 6 are provided corresponding to the impact descaling gear roller groups 5. In this embodiment, there are two pairs of impact type descaling gear roller groups 5, between which a scale scraps cleaning water nozzle group 9 is disposed.

Figure 3:
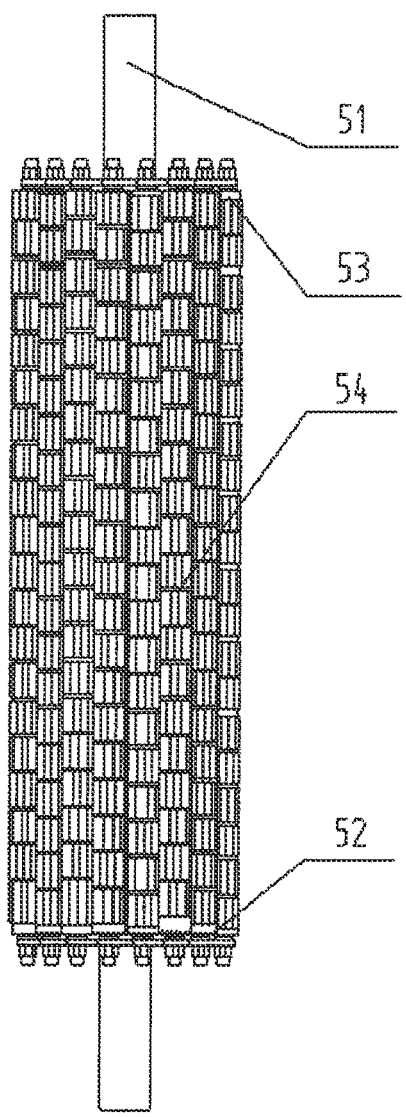
FIG. 3 is the schematic view of the structure of impact descaling gear roller group according to the present disclosure.
Figure 4:
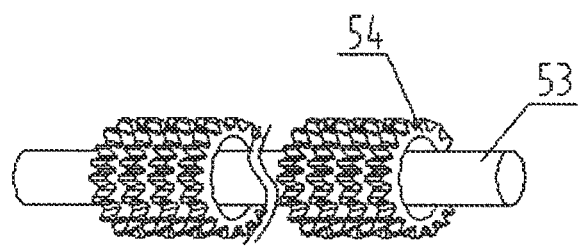
FIG. 4 is the schematic view of the descaling gear group in the impact descaling gear roller group.

As shown in FIG. 3 and FIG. 4, the present disclosure is further described below. The impact descaling gear roller group 5 includes a main shaft 51, fixed plates 52, a descaling gear assembly shaft 53 and a descaling gear group 54. There is one pair of fixed plates 52, which are fixed on the two sides of the main shaft 51. Between the pair of fixed plates 52 there are disposed with a plurality of descaling gear assembly shafts 53 in a ring array with a center at the central-axis of the main shaft 51. The descaling gear group 54 consists of a row of descaling pinions which are mounted in series on the descaling gear assembly shaft 53. There is a gap between each descaling gear and the descaling gear assembly shaft 53 as the inner diameter of the former is 3~30 mm greater than the outer diameter of the latter. Moreover, the descaling gear is made of heat-resistant and wear-resistant alloy steels.

To improve the adaptability of the present disclosure, the descaling device further includes a hot slab thickness measurement device 2 which is disposed upstream of the front cooling water nozzle group 4, and a height adjustment device 81 through which the impact descaling gear roller group 5 is mounted on the support seat 8.

As shown in FIG. 2, the impact type descaling gear roller group 5 is mounted at an angle α with the moving direction of the slab 1, wherein α is 15°~90°. In operation, the impact type descaling gear roller group 5 is cooled by the roller cooling device 6 spraying cooling water of 0.2~1.0 MPa. The impact descaling gear roller group 5 is driven by motors. The descaling gear teeth are made of heat-resistant and wear-resistant alloy steel. Before the hot slab 1 is conveyed through the slab roller table 3 to the descaling device of the present disclosure, the hot slab thickness measurement device 2 measures out the actual thickness of the hot slab, and according to the thickness, the height adjustment device 81 adjusts the distance between the impact descaling gear roller group 5 and the slab 1; then the scales on the surface of the hot slab 1 is cooled by the front cooling water nozzle group 4 with spraying water of 0.2~2.0 MPa; subsequently, the hot slab 1 is descaled by a first impact descaling gear roller group 5—the scales 10 on the surface of the slab 1 is knocked, broken and planed away from the surface of the slab 1 by the descaling gears; and the scale scraps are obliterated away by the cleaning water nozzle group 9. The slab 1 is descaled again by a second impact descaling gear roller group 5, that is, the scales on the surface thereof not yet being cleared by the first impact descaling gear roller group 5 are obliterated. The surface of the slab 1 is cleaned by the cleaning water nozzle group 7 through spraying water of 0.2~2.0 MPa. For those slabs difficult to clear scales thereon, another impact descaling gear roller groups 5 may be added.

The invention claimed is:

1. A mechanical descaling device of a impact type for hot rolled slab, characterized in that the device comprises a front cooling water nozzle group, a descaling gear roller group of a impact type, a roller cooling device and a cleaning water nozzle group; the slab moves on a slab roller table; the front cooling water nozzle group, the descaling gear roller group and the cleaning water nozzle group are arranged in sequence in the moving direction of the slab; the descaling gear roller group is mounted on a support seat, and cooling water nozzle of the roller cooling device are provided corresponding to the descaling gear roller group; wherein, the descaling gear roller group comprises a main shaft, descaling gear assembly shaft and descaling gear group, a plurality of the descaling gear assembly shafts in a ring array with a center at central-axis of the main shaft are supported by fixed plates disposed on the main shaft; for each descaling gear assembly shaft, a row of descaling gears of one descaling gear group are mounted thereon in series; the descaling gear roller group is inclined at an angle with the moving direction of the slab.

2. The mechanical descaling device hot rolled slab according to claim 1, characterized in that number of fixed plates is one pair, the pair are fixed at two sides of the main shaft; between the pair of fixed plates are disposed with the descaling gear assembly shafts.

3. The mechanical descaling device hot rolled slab according to claim 2, characterized in that there is a gap between the descaling gear and the descaling gear assembly shaft as inner diameter of the former is 3 mm to 30 mm greater than outer diameter of the latter.

4. The mechanical descaling device hot rolled slab according to claim 1, characterized in that the descaling device also includes a hot slab thickness measurement device which is disposed upstream of the front cooling water nozzle group, and a height adjustment device through which the descaling gear roller group is mounted on the support seat.

5. The mechanical descaling device hot rolled slab according to claim 1, characterized in that number of the descaling gear roller group are two pairs, between the two pairs a scale scraps cleaning water nozzle group is disposed.

* * * * *